US011911920B2

(12) United States Patent
Bomel et al.

(10) Patent No.: US 11,911,920 B2
(45) Date of Patent: Feb. 27, 2024

(54) SYSTEM FOR THE TEMPORARY STORAGE OF OBJECTS

(71) Applicant: UNIVERSITE DE BRETAGNE SUD, Lorient (FR)

(72) Inventors: Pierre Bomel, Concarneau (FR); Eric Martin, Lorient (FR)

(73) Assignee: UNIVERSITE DE BRETAGNE SUD, Lorient (FR)

( * ) Notice: Subject to any disclaimer, the term of this patent is extended or adjusted under 35 U.S.C. 154(b) by 192 days.

(21) Appl. No.: 17/433,098

(22) PCT Filed: Feb. 24, 2020

(86) PCT No.: PCT/EP2020/054768
§ 371 (c)(1),
(2) Date: Aug. 23, 2021

(87) PCT Pub. No.: WO2020/173874
PCT Pub. Date: Sep. 3, 2020

(65) Prior Publication Data
US 2022/0088789 A1 Mar. 24, 2022

(30) Foreign Application Priority Data
Feb. 28, 2019 (FR) ...................................... 1902044

(51) Int. Cl.
*B25J 9/16* (2006.01)
*G05B 19/4155* (2006.01)

(52) U.S. Cl.
CPC ........ *B25J 9/1697* (2013.01); *G05B 19/4155* (2013.01); *G05B 2219/31043* (2013.01)

(58) Field of Classification Search
CPC ............... B25J 9/1697; G05B 19/4155; G05B 2219/31043
See application file for complete search history.

(56) References Cited

U.S. PATENT DOCUMENTS 4,059,187 A * 11/1977 Rueff ................... B65G 47/843
414/749.5
4,413,724 A * 11/1983 Fellner ................... B65G 1/133
198/594
(Continued)

FOREIGN PATENT DOCUMENTS

| EP | 1967928 A2 | 9/2008 |
| JP | H07-178652 A | 7/1995 |
| JP | 2013-254261 A | 12/2013 |

OTHER PUBLICATIONS

Mar. 16, 2020 International Search Report issued in International Patent Application No. PCT/EP2020/054768.
Jan. 1, 2015 European Examination Report.

*Primary Examiner* — Kyle O Logan
(74) *Attorney, Agent, or Firm* — Williams Mullen; R. Brian Drozd (57) ABSTRACT

A temporary-storage system that includes a temporary-storage belt, a control unit and signalling means. The temporary-storage belt comprises a plurality of regularly distributed sensors. During a loading phase, the control unit receives information coming from at least one of the sensors when an object is deposited on the temporary-storage belt and records a trace of the deposition of the object in association with a reference to each of the sensors activated by the deposition. During an unloading phase, the control unit determines a sequence of removal of the objects and, for each object to be removed, identifies the sensors referenced, transmits to the signalling means signalling information identifying the position of the object, and receives information coming from at least one of the sensors when the object is removed.

14 Claims, 5 Drawing Sheets

(56) References Cited

U.S. PATENT DOCUMENTS

| | | | | |
|---|---|---|---|---|
| 4,513,858 A * | 4/1985 | Fellner | B65G 1/133 | 198/836.1 |
| 4,805,778 A * | 2/1989 | Nambu | B07C 5/00 | 209/3.3 |
| 5,348,139 A * | 9/1994 | Szarkowski | B65G 47/261 | 198/781.05 |
| 5,984,498 A * | 11/1999 | Lem | G05B 19/0421 | 700/228 |
| 6,152,291 A * | 11/2000 | Steeber | B65G 47/5131 | 198/594 |
| 7,260,240 B2 * | 8/2007 | Tran | G06T 7/0002 | 209/552 |
| 8,573,380 B2 * | 11/2013 | Petrovic | B65G 47/5131 | 198/347.4 |
| 9,896,271 B1 * | 2/2018 | Steeber | B65G 47/5122 | |
| 10,259,658 B2 * | 4/2019 | Anca | B65G 47/684 | |
| 11,338,999 B2 * | 5/2022 | Hu | B65G 47/24 | |
| 2003/0231317 A1 * | 12/2003 | Sepulveda Carlos | G01K 1/16 | 374/E1.021 |
| 2004/0035928 A1 * | 2/2004 | Anderson | B64F 1/366 | 235/385 |
| 2004/0222070 A1 * | 11/2004 | Neiser | B65G 1/08 | 198/786 |
| 2005/0075752 A1 * | 4/2005 | Ban | G05B 19/4182 | 700/213 |
| 2005/0075754 A1 * | 4/2005 | Zeitler | B65G 43/08 | 700/230 |
| 2007/0007924 A1 * | 1/2007 | Nishihara | G05B 19/4182 | 318/560 |
| 2007/0108016 A1 * | 5/2007 | Eaton | B65G 47/44 | 198/348 |
| 2007/0179671 A1 * | 8/2007 | Arimatsu | G05B 19/4182 | 700/247 |
| 2009/0000386 A1 * | 1/2009 | Paradis | G01D 3/028 | 244/129.1 |
| 2010/0121489 A1 * | 5/2010 | Inazumi | G05B 19/402 | 700/255 |
| 2018/0164788 A1 * | 6/2018 | Shimamura | B25J 9/0093 | |
| 2018/0200761 A1 * | 7/2018 | Putcha | G06Q 50/28 | |
| 2018/0250810 A1 * | 9/2018 | Sirkett | G01B 11/26 | |

* cited by examiner

SYSTEM FOR THE TEMPORARY STORAGE OF OBJECTS

TECHNICAL FIELD

The present invention relates to the field of the temporary storage of objects. One technical field of application of the present invention is arranging a production line. More precisely, the present invention proposes a temporary-storage system that is intended to be interposed between an upstream station and a downstream station of the production line, and which makes it possible to automatically manage a sequencing at the discharge, from the temporary-storage system to the downstream station, of objects previously presented to the temporary-storage system from the upstream station.

PRIOR ART

In a production line, the various operations of manufacturing, transforming or assembling a product are performed successively at workstations disposed in a pre-established order.

In an in-line configuration where the workstations follow each other, the production flow leaving one workstation (called the "upstream station") is directly related to the production flow entering the following workstation (called the "downstream station"). All the operations of the production line then require balanced flows between the workstations at each instant for optimum efficiency.

Generally, asynchronisms, such as unforeseen events or breakdowns, occurring at the workstations interfere with the correct functioning of the production line by causing desynchronisation of the production flows within the production line. In one example, when there is a sudden stoppage of the production flow entering the downstream station, because in particular of a breakdown of a machine, the flow leaving the upstream station is also stopped because of an accumulation of objects at the discharge from the upstream station. This causes the forced stoppage of the upstream station. By propagation of the phenomenon, the stoppage of a downstream station can thus cause the stoppage of the whole of the production line situated upstream, which impairs the efficiency of the production line. Some production operations also require that a plurality of objects are simultaneously made available, as is the case with assembly operations. The flow entering such an assembly station is therefore directly connected to the production flows leaving the various upstream stations disposed in parallel. An unforeseen event occurring on one of the upstream stations causes the interruption of the flow emerging from the upstream station. This causes a wait at the assembly station, causing an accumulation of objects leaving the other upstream stations. An unforeseen event may thus give rise to a forced stoppage of several parallel lines in the production chain. In another example, an asynchronism between an upstream station and a downstream station is simply due to different, e.g. non-regular, speeds between the upstream station and the downstream station.

It is desirable to provide a solution that makes it possible to store accumulated objects outside the production flow.

It is moreover desirable to provide a solution that makes it possible to maintain the operation of an upstream station when a desynchronisation between the flow leaving the upstream station and the flow entering the downstream station causes an accumulation of objects.

It is also desirable to provide a solution that makes it possible, when the flow entering the downstream station resumes, to restock the downstream station in an ordered and automatic manner.

It is in particular desirable to provide a solution that, when the flow entering the downstream station resumes, respects an order of arrival of the objects leaving the upstream station, without an operator having to memorise this order of arrival of the objects or to bother with classifying said objects in an ordered manner during the desynchronisation time.

It is in particular desirable to provide a solution that makes it possible to re-order objects that have arrived out of order from the downstream station.

It is also desirable to provide a solution that makes it possible to keep the upstream station and the downstream station in operation when an asynchronism exists between said upstream station and said downstream station.

DISCLOSURE OF THE INVENTION

The invention relates to a method for the temporary storage of objects in a temporary-storage system comprising a temporary-storage belt, a control unit and signalling means. The temporary-storage belt comprises a plurality of regularly distributed sensors, the position of each sensor on the temporary-storage belt being distinctly identified. The temporary-storage method comprises a loading phase wherein the control unit performs the following steps: when an object is deposited on the temporary-storage belt, the control unit receives corresponding information coming from at least one of the sensors and, for each deposition of a detected object, the control unit records a trace of the deposition of the object in association with a reference to each of the sensors activated by the deposition of the object. The temporary-storage method comprises a discharge phase wherein the control unit determines a removal sequence indicating the order in which the objects deposited on the temporary-storage belt must be removed and, for each object to be removed in the order of the removal sequence, the control unit identifies the referenced sensors that were activated by the deposition of the object in the context of the loading phase, transmits to the signalling means signalling information identifying the position of the object to be removed from the identified sensors, and, when the object is removed from the temporary-storage belt, the control unit receives corresponding information coming from at least one of the sensors, and continues the removal sequence with a new object to be removed, if such exists. Thus it is possible to temporarily store objects outside the production flow and next to recover these objects in a predefined order without having to bother with the place where the objects are temporarily placed.

According to a particular embodiment, in the loading phase, the recording of a trace of the deposition of the object is performed in association with a deposition rank, and, in the discharge phase, the removal sequence is defined according to the deposition ranks of objects. Thus the sequencing of the objects in the production flow is easily managed.

According to a particular embodiment, the discharge phase further comprises, following the detection of the absence of the object to be removed by at least one of the sensors, a check whether there is a match between the sensors referenced in association with the deposition of the objects and the sensors that detected the absence of the object and, in the event of a negative check, a triggering of an alarm. Thus the control unit indicates an error committed when an object is removed in an order different from the one defined by the removal sequence and it is then possible to correct the error.

According to a particular embodiment, the alarm triggered in the event of a negative check indicates re-placing the object that was removed in error. The sensors activated by the redeposition of the object are referenced in association with the trace of the deposition of the object that was removed in error and in replacement for the sensors previously referenced in association with the trace of the deposition of said object. Thus, when an object is removed in error and then redeposited at another location on the temporary-storage belt, the signalling means can correctly indicate the new location of the object when said object must be removed in its turn.

According to a particular embodiment of the invention, the removal sequence determined follows a FIFO method. Thus it is possible to easily reintegrate the stored objects in a production line in the same order as the order in which the objects were removed from the production line.

According to a particular embodiment of the invention, the loading phase and the unloading phase are implemented in parallel by the control unit. Thus it is possible to regulate an asynchronism in a production line.

According to a particular embodiment of the invention, the control unit calculates a position on the temporary-storage belt of each object deposited and the signalling information indicates the calculated position of the object so that a robot can unload the object from the calculated position. Thus the position of an object can be transmitted to a robot, which can then determine and then make a movement for recovering the object. Objects are thus easily removed automatically.

The invention also relates to a computer program comprising a set of instructions causing the execution, by a processor, of the aforementioned temporary storage-method, when said computer program is executed by said processor. The invention also relates to an information storage medium storing such a computer program.

The invention also relates to a system for the temporary storage of objects, comprising a temporary-storage belt, a control unit and signalling means. The temporary-storage belt comprises a plurality of regularly distributed sensors, the position of each sensor on the temporary-storage belt being distinctly identified. The temporary-storage system comprises, in a loading phase, when an object is deposited on the temporary-storage belt, means for receiving corresponding information coming from at least one of the sensors and, for each object deposition detected, means for recording a trace of the deposition of the object in association with a reference to each of the sensors activated by the deposition of the object. The temporary-storage system comprises, in an unloading phase, means for determining a removal sequence indicating the order in which the objects deposited on the temporary-storage belt must be removed. The temporary-storage system further comprises, in the unloading phase, for each object to be removed in the order of the removal sequence, means for identifying the referenced sensors that were activated by the deposition of the object in the context of the loading phase, means for transmitting to the signalling means signalling information identifying the position of the object to be removed from the sensors identified, and, when the object is withdrawn from the temporary-storage belt, means for receiving corresponding information coming from at least one of the sensors, and continuing the removal sequence with a new object to be removed, if such exists.

According to a particular embodiment of the invention, the signalling means comprise an illumination device integrated in the temporary-storage belt, the illumination device comprising at least one lamp identifying the location of each sensor. Thus a human operator can easily identify the location of an object signalled directly on the temporary-storage belt.

According to a particular embodiment of the invention, the signalling means comprise a display screen comprising at least one signalling zone showing the location of each sensor. Thus a human operator can, from a screen, easily identify the location of an object being signalled.

According to a particular embodiment of the invention, each sensor of the temporary-storage system is connected to the control unit by means of a track, and the temporary-storage belt comprises five layers superimposed in the following order: a first shielding layer, a first insulation layer, a conductive central layer forming the sensors and the tracks, a second insulation layer and a second shielding layer. Thus the sensors are monitored independently of each other by the control unit and integrating the sensors in the temporary-storage belt is easy and inexpensive.

According to a particular embodiment of the invention, the control unit comprises a processor executing the aforementioned computer program and furthermore comprises a microcontroller in the temporary-storage belt that executes embedded software performing measurements and a filtering of the signals detected by each sensor, so as to detect the activation and the deactivation of each sensor. Thus the temporary-storage system can easily be integrated in a control system of a production line.

The invention also relates to a production line comprising a temporary-storage system and further comprising an upstream production station and a downstream production station. The production line comprises means for transmitting to the control unit a command to start the loading phase, so that, when an asynchronism occurs between the upstream production station and the downstream production station or when a sequencing fault occurs on the upstream production station and an object is deposited on the temporary-storage belt, the control unit detects the presence of the object. When the asynchronism or respectively the sequencing problem disappears, the production line transmits to the control unit a command to start the unloading phase. Thus the operation of the upstream station can be maintained by means of the storage of the accumulated objects and the downstream station is supplied with objects in an ordered and automatic manner.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
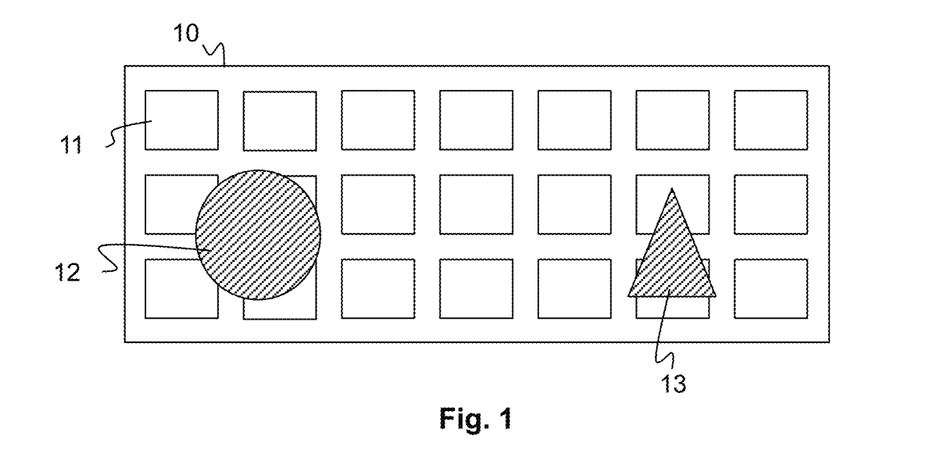
FIG. 1 illustrates schematically a temporary-storage belt in plan view.

FIG. 1 shows a temporary-storage belt 10 in plan view. The temporary-storage belt 10 comprises sensors 11 integrated in the temporary-storage belt 10 and regularly distributed over the temporary-storage belt 10. The position of each sensor 11 on the temporary-storage belt 10 is distinctly identified and different from the position of each of the other sensors 11.

Objects 12, 13 can be deposited on the temporary-storage belt 10, for example by an operator or a robot. Each sensor 11 is sensitive to the presence of an object 12, 13 when said object 12, 13 is deposited in a sensitivity zone of said sensor 1. As soon as the object 12, 13 is deposited on the temporary-storage belt 10 and enters the sensitivity zone of said sensor 11, said sensor 11 is activated by the object 12, 13 the deposition of which is detected by said sensor 11. The sensor 11 is then able to transmit information representing the detection of the presence of the object 12, 13. Conversely, the sensor 11 detects the absence of the object 12, 13 previously deposited as soon as the object 12, 13 completely leaves the sensitivity zone of said sensor 11. It is then said that said sensor 11 is deactivated.

The sensors 11 may for example be of the resistive type and are then sensitive to the pressure that is exerted by the object 12, 13. The sensitivity zone of these sensors 11 is then defined as the space around said sensors 11, and more precisely on the surface of the temporary-storage belt 10, in which said sensors 11 detect a change in pressure above a predefined threshold when an object is deposited thereon. A sensor 11 of the resistive type is a variable resistor, the variation of which depends on the pressure applied, which is coupled in series with another resistor so as to form a voltage divider bridge. An analogue to digital converter measures the variation in voltage of the divider bridge, and makes it possible to measure the variation in pressure applied to the sensor 11.

The sensors 11 may in a variant be of the capacitive type: the physical phenomenon exploited is of an electrostatic nature. The sensors 11 are sensitive to the size of the surface and therefore to the shape of the object 12, 13, as well as to the conductivity of the material of the object 12, 13. The sensitivity zone of these sensors 11 is then defined as the space around said sensors 11 in which said sensors 11 detect a change in electromagnetic field above a predefined threshold when an object is deposited therein. The activation of a sensor 11 of the capacitive type occurs when the object 12, 13 is therefore located at a sufficiently close distance to the sensor 11, which optionally makes it possible to cover the temporary-storage belt 10 with a protective film or layer, for example made from rubber, without impairing the detection capabilities of said sensor 11.

Figure 2A:
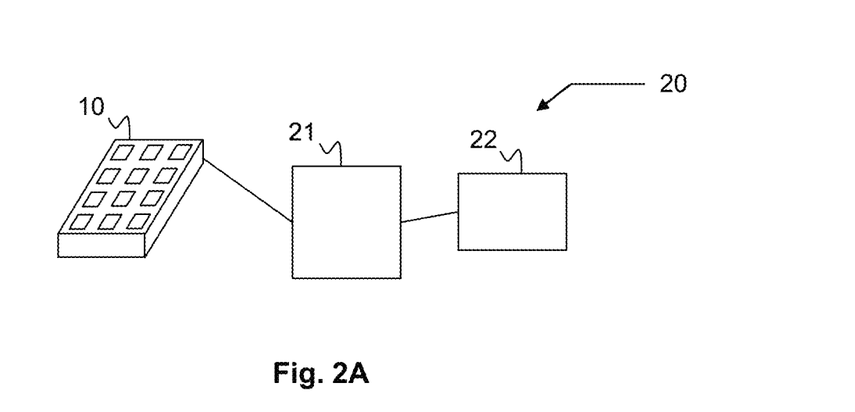
FIG. 2A illustrates schematically a temporary-storage system incorporating the temporary-storage belt.

FIG. 2A illustrates a temporary-storage system 20. The temporary-storage system 20 comprises the temporary-storage belt 10, a control unit 21 and signalling means 22.

The control unit 21 is connected to the sensors 11 and to the signalling means 22. The control unit 21 serves to control and coordinate the temporary-storage system 20. The control unit 20 may be a component, or a set of interconnected components, or a processor executing software, or a set of processors executing respective softwares cooperating to control and coordinate the temporary-storage system 20. This aspect is in particular dealt with below in relation to FIG. 9.

In a particular embodiment, the control unit 21 is based around a processor executing application software, for example a computer connected to the temporary-storage belt 10. The control unit 21 further comprises a microcontroller in the temporary-storage belt 10 connected to the processor and the application software thereof, for example using a wireless connection (e.g. of the Bluetooth type or of the Wi-Fi type) or a wired connection (e.g. of the USB (Universal Serial Bus) type. This microcontroller executes embedded software that performs measurements and a filtering of the signals detected by each sensor 11, so as to detect the activation and the deactivation of each sensor 11. All the sensors 11 are scanned by the microcontroller in order to extract a current state (activated or deactivated) for each sensor 11. An acquisition corresponds to a given number of successive identical scans. For each acquisition, the microcontroller identifies each sensor 11 the state of which (activated or deactivated) has changed with respect to the previous acquisition. The control unit 21 may also comprise a messaging agent (or "broker"), using for example an MQTT protocol ("Message Queuing Telemetry Transport", as defined in the ISO/IEC standard PRF 20922), and which makes it possible to manage the communications between the microcontroller and its embedded software on the one hand and the application software on the other hand. Such a messaging agent makes it possible to make the temporary-storage system 20 interact easily with other control elements of a production line.

The signalling means 22 provide signalling instructions that make it possible to identify the location of an object on the temporary-storage belt 10. According to the embodiment, the signalling means 22 are integrated in the control unit 21 or external to the control unit 21. Two families of signalling means 22 exist depending on whether the temporary-storage system 20 collaborates with a robot or the temporary-storage system 20 is used by a human operator. In the case where the temporary-storage system 20 collaborates with a robot, the signalling means 22 provide signalling instructions that can be understood by a machine and indicate to the robot the position at which the robot must recover an object 12, 13 on the temporary storage bolt 10. The signalling means 22 are then a control interface of the robot. The robot is typically controlled by control software that receives the signalling instructions coming from the signalling means 22 and orders the movement of the robot accordingly. In the case of a use by a human operator, the signalling means 22 are visual signalling means, such as a display device, which indicate the location of an object 12, 13 to be removed. The location of the object 12, 13 is indicated by means of signalling zones, each signalling zone representing or indicating a position on the temporary-storage belt 10, corresponding for example to the position of one or more sensors 11. The visual signalling means 22 may be a display screen, such as an LED (light-emitting diode) display or a computer screen, or a lighting device integrated in the temporary-storage belt 10, for example by means of LEDs.

Figure 3A:
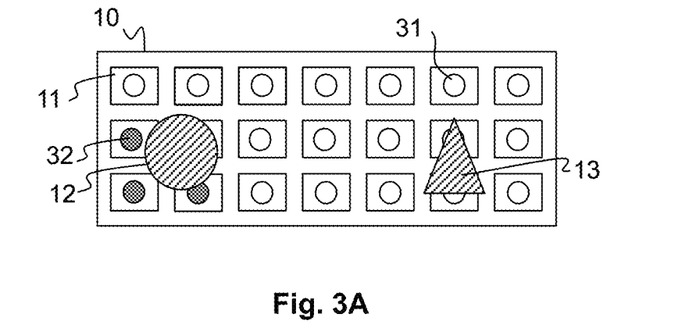
FIG. 3A illustrates schematically signalling means of the temporary-storage system, according to a first embodiment.
Figure 3B:
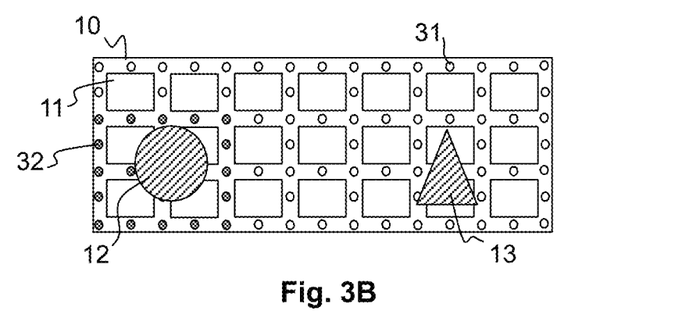
FIG. 3B illustrates schematically the signalling means of the temporary-storage system, according to a second embodiment.

FIG. 2A shows a case where the signalling means 22 are visual signalling means that are separated from the temporary-storage belt 10, but such visual signalling means may in a variant be integrated in the temporary-storage belt 10, as for example shown in FIGS. 3A and 3B.

The temporary-storage system 20 has two operating phases: a loading phase and an unloading phase. The two phases may be implemented sequentially, the loading phase being executed first and the unloading phase being executed second. The two phases may in a variant be implemented in parallel.

The loading phase makes it possible to detect successive depositions of objects on the temporary-storage belt 10 and thus to temporarily store objects 12, 13. The unloading phase supplies to an operator or a robot indications making it possible to remove, in a predetermined order, objects deposited on the temporary-storage belt 10. During the unloading phase, the signalling means 22 indicate the order in which the objects 12, 13 must be recovered after temporary storage, in order for example to be reintegrated in a production line. By means of these two phases, the temporary storage means 20 makes it possible to temporarily store objects without being concerned with the place where the objects in question are successively placed on the temporary-storage belt 10, and makes it possible then to recover the objects stored in the correct order by following the indications of the signalling means 22.

In the loading phase, when an object, for example the object 12, is deposited on the temporary-storage belt 10, at least one sensor 11 is activated by the deposition of the object 12. Each sensor 11 that detects that an object has entered its sensitivity zone is activated by the deposition of the object 12 and transmits information representing an activation, or in other words a detection of the presence of an object, to the control unit 21. The control unit 21 receives the information representing activation of the sensor or sensors, records a trace of the object deposition in association with a reference to each sensor 11 activated by the deposition of the object 12 and, preferentially, information representing a deposition rank. In a particular embodiment, and in particular in the case where the temporary-storage system is collaborating with a robot, the control unit 21 furthermore calculates the position of the object 12 and records the calculated position in association with the trace of the deposition of the corresponding object.

When another object, for example the object 13, is then deposited on the temporary-storage belt 10, the same process is reproduced. In the loading phase, objects are deposited on the temporary-storage belt 10 in a deposition sequence, each object deposited thus having its own rank in the deposition sequence.

In the unloading phase, the control unit 21 determines a removal sequence indicating the order in which all the objects 12, 13 deposited on the temporary-storage belt 10 must be removed. In the order defined by the removal sequence, the control unit 21 successively identifies each object to be removed. For each object to be removed, the control unit 21 determines signalling information for identifying the location of said object. The signalling information may be different depending on whether the temporary-storage system 20 is collaborating with a robot or the temporary-storage system 20 is being used by an operator. The signalling information may, according to circumstances, comprise the reference to the sensors 11 activated by the deposition of the object in question, an identification of the signalling zones to be activated, or the calculated position of the object in question.

The control unit 21 next transmits the signalling information to the signalling means 22. The signalling means 22 then indicate to the robot or to the operator, by means of instructions (machine instructions or visual instruction), the position of the next object to be moved.

In a particular embodiment, application software of the control unit 21 comprises two tasks ("threads") that can be performed in parallel. The first task takes care of the loading phase, continuously detects depositions of successive objects and records the traces of the depositions of objects in the order of ranks of depositions. The second task takes care of the unloading phase and determines a removal sequence (for example in FIFO (first in first out) mode from the traces of deposition of objects recorded by the first task. The second program then determines signalling information representing locations of the objects to be removed according to the removal sequence, and then successively, in the order defined by the removal sequence, transmits the signalling information to the signalling means 22.

Figure 2B:
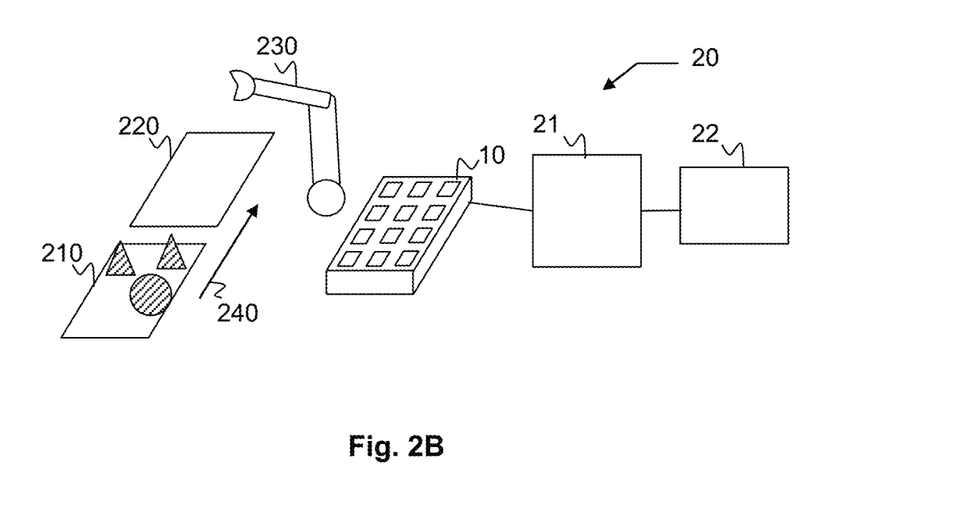
FIG. 2B illustrates schematically a production line comprising the temporary-storage system.

FIG. 2B illustrates a production line comprising the temporary-storage system 20, and also an upstream production station 210 and a downstream production station 220 that follow each other in a production flow direction 240.

The temporary-storage system 20 then makes it possible to overcome any asynchronism between the production flow at the upstream production station 210 and the production flow at the downstream production station 220.

In such a case of asynchronism, a command for starting the loading phase is transmitted to the control unit 21. For example, pressing on a button making it possible to identify a machine that is broken down or the detection by a detector of an accumulation of objects in a zone of the production line cause the transmission of information to a system controlling the production line. The control system then transmits the command starting the loading phase to the control unit 21. An operator or a robot 230 can then recover the objects leaving the upstream production station 210 and deposit them successively on the temporary-storage belt 10, which makes it possible to release the discharge from the upstream production station 210. The command to start the loading phase can also be transmitted to the control unit 21 by anticipation of a possible asynchronism. The control unit 21 then simply awaits a deposition of an object.

In the case of a sequential functioning of the loading and unloading phases, when the asynchronism between the upstream production flow and the downstream production flow disappears, for example when the downstream production station 220 is restarted, a command to switch from the loading phase to the unloading phase is transmitted to the control unit 21. The switching command may be separated into a command for stopping the loading phase and a following command for starting the unloading phase.

The order defined by the removal sequence may for example be the same as the order of the deposition sequence. Thus stoppage or disorganisation of the upstream production station 210 is avoided as well as the consequences thereof on the whole of the production line. This makes it possible to maintain the sequencing of the objects in the production flow despite the activation of the temporary-storage system 20. The order defined by the removal sequence may also correspond to an order different from that of the deposition sequence, such as for example the reverse order or an order independent of that of the deposition sequence. This makes it possible to re-order the objects in the production flow, when for example a sequencing incident has occurred upstream.

FIG. 3A shows an embodiment of the signalling means 22 wherein an illumination device is integrated in the temporary-storage belt 10 and for which each sensor 11 is identified by a signalling zone represented by a lamp 31, 32. Each of the lamps 31, 32 has two distinct light-emission states that are called "activated state" and "deactivated state" and is associated with a sensor 11. The activated state makes it possible to signal the location of an object 12, 13 on the temporary-storage belt 10. Each lamp 31, 32 associated with a sensor 11 that has been activated by the deposition of the object 12, 13 in question is put in the activated state when the object 12, 13 in question must be signalled by the signalling means 22. The activated and deactivated states of each lamp can be distinguished in several ways according to the embodiments. For example, the lamp in an activated state can emit a light signal while the lamp in a deactivated state does not emit any light signal, or vice versa. The activated state of a lamp may also correspond to one light-emission colour, while the deactivated state corresponds to another light-emission colour. It is also possible for the activated state to correspond to blinking while the deactivated state corresponds to a constant light emission or no light emission.

In the unloading phase, when an object 12, 13 must be removed, the control unit 21 finds in memory information identifying each sensor 11 referenced in association with the trace of the deposition of the object in question, in other words information identifying each sensor 11 previously activated when said object is deposited in the context of the loading phase. The control unit 21 next transmits to the signalling means 22 information indicating activating solely each lamp 32 corresponding to each sensor 11 previously activated when said object is deposited in the context of the loading bays.

FIG. 3B shows an embodiment of the signalling means 22 wherein an illumination device is integrated in the temporary-storage belt 10 and for which each sensor 11 is identified by a plurality of signalling zones represented by lamps 31, 32 surrounding said sensor 11 on the temporary-storage belt 10. In this example, each sensor 11 is surrounded by eight lamps 31, 32 (e.g. LEDs) and each lamp 31, 32 corresponds to one, two or four sensors 11 depending on whether the lamp 32 is placed alongside one, two or four sensors 11 on the temporary-storage belt 10. Each of the lamps 31, 32 can be in an activated state or a deactivated state in order to signal the location of an object 12, 13, as described in FIG. 3A.

In the unloading phase, when an object 12, 13 must be removed, the control unit 21 finds in memory information identifying each sensor 11 referenced in association with the trace of the deposition of the object in question, in other words information identifying each sensor 11 previously activated when said object was deposited in the context of the loading phase. The control unit 21 then transmits to the signalling means 22 information indicating activating solely each lamp 32 of the signalling zone corresponding to each sensor 11 previously activated when said object was deposited in the context of the loading phase.

Figure 4:
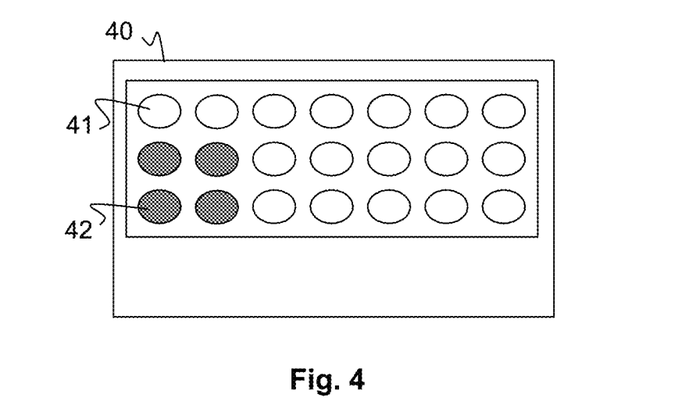
FIG. 4 illustrates schematically the signalling means of the temporary-storage system, according to a third embodiment.

FIG. 4 shows an embodiment of the signalling means 22 wherein a display 40 depicts the temporary-storage belt 10. The position of each sensor 11 on the temporary-storage belt 10 is represented by one or more signalling zones 41, 42 of the display 40. The signalling zones 41, 42 are for example LEDs that can be in an activated state or in a deactivated state. In the unloading phase of the temporary-storage system 20, when an object 12, 13 must be removed, the control unit 21 finds in memory the information identifying each sensor 11 referenced in association with the trace of the deposition of the object 12, 13 in question, and transmits to the display 40 information indicating activating solely each signalling zone 42 corresponding to each sensor 11 previously activated when said object was deposited in the context of the loading phase.

In a particular embodiment, in the loading phase, the control unit 21 transmits to the signalling means 22 information indicating to signal each sensor 11 activated when an object was deposited. In this way, when each object is deposited, the location of the object deposited is signalled. LEDs with different colours may for example be used for distinguishing a signalling made during the loading phase from a signalling made during the unloading phase. This enables the operator to check that the object has indeed been detected by the temporary-storage system 20.

Figure 5:
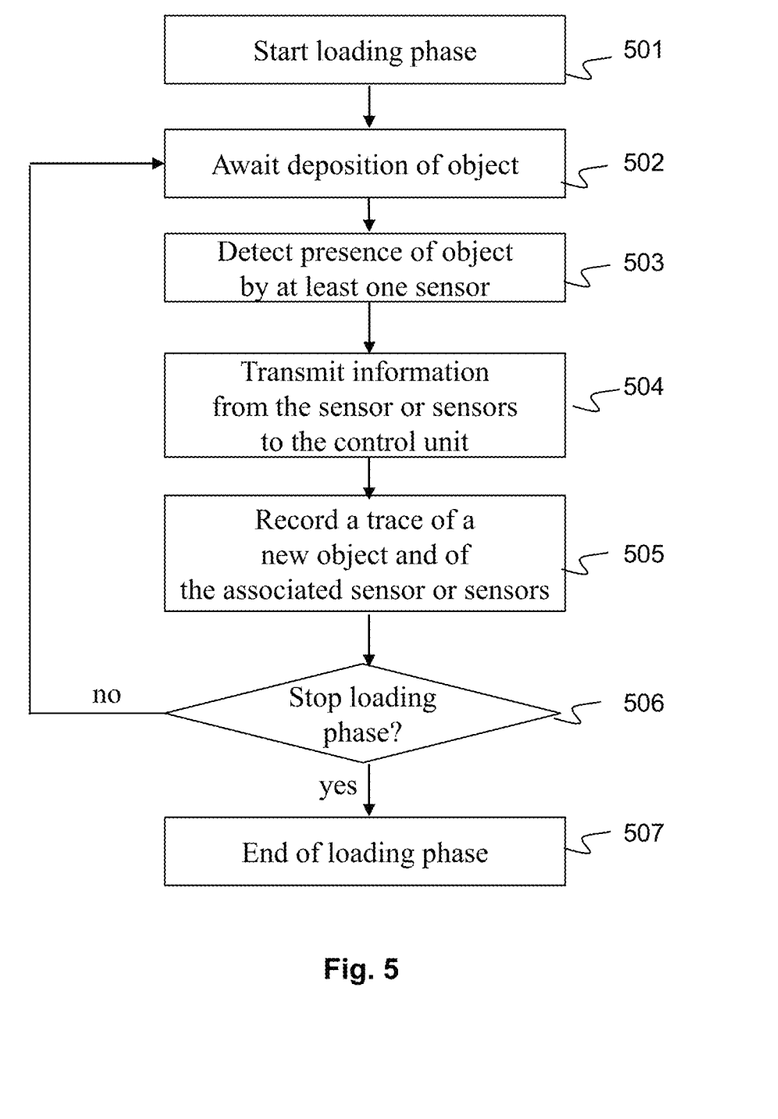
FIG. 5 illustrates schematically a method for detecting objects.

FIG. 5 shows schematically a method for detecting objects implemented by the temporary-storage system 20 in the loading phase.

In a first step 501, the control unit 21 receives a command to start the loading phase, following for example the stoppage of the downstream production station 220 or in anticipation of a possible asynchronism.

In a step 502, the control unit 21 awaits the deposition of an object on the temporary-storage belt 10. An object 12, 13 can then be deposited on the temporary-storage belt 10, for example by the operator or the robot 230.

When an object, for example the object 12, is deposited on the temporary-storage belt 10, the presence of the object in question is detected in a step 503 by the activation of at least one sensor 11 located in the deposition zone of said object 12.

In a step 504, the control unit 21 receives information representing a detection of the presence of the object 12 transmitted by each sensor 11 activated by the deposition of the object 12.

In a step 505, the control unit 21 lists the presence of the object 12 by recording a trace of the deposition of said object 12, in association with a reference to each sensor 11 activated by the deposition of the object 12, as well as preferentially information representing the deposition rank of the object 12. The deposition rank of an object can be recorded for example in the form of a timestamp, or by means of a counter the value of which is incremented at each new deposition of an object, or implicitly by means of a concatenated list of depositions. The recording of the reference to each sensor 11 activated by the deposition of the object 12 comprises an identification (e.g. the position on the temporary-storage belt 10) of each sensor 11 on the temporary-storage belt 10 that was activated by the deposition of the object 12. In a particular embodiment, the recording of the reference to each sensor 11 activated by the deposition of the object 12 also comprises values of physical quantities measured by said sensor.

In a particular embodiment, the control unit 21 identifies, for each deposition of an object, if there is inconsistency between the identification of the sensor or sensors 11 activated by the deposition of an object and certain predefined parameters such as the shape or size of the object. This is the case for example when only three sensors 11 have detected the presence of the same object and the shape of said object means that the object in question is positioned in the sensitivity zone of a fourth sensor 11. When such is the case, the control unit 21 identifies the most probable configuration of sensors 11 supposed to be activated by the deposition of an object in question and modifies the references to the sensors 11 recorded in association with the trace of the deposition of an object while taking account of said configuration.

In a particular embodiment, the control unit 21 furthermore calculates the position of the object 12, for example in the form of coordinates of the barycentre of the supposed surface of contact of the object with the temporary-storage belt 10 in a predefined reference frame, and records the position of said object 12 in association with the trace of the deposition of the object 12. In calculating the position of the object 12, account is taken of the identification of each sensor activated by the deposition of the object 12 and optionally of predefined parameters such as the shape and dimensions of the object 12. Conversion calculations of the coordinates between various reference frames may also be made.

In a following step 506, the control unit 21 checks whether a command stopping the loading phase has been received, for example following the resumption of the downstream production station 220. If such is the case, a step 507 is performed. Otherwise the method is reiterated as from the step 502, and the control unit 21 awaits a new deposition of an object. For example, if the object 13 is next deposited, the sensor or sensors 11 located in the deposition zone of the object 13 are activated in the step 503, and the steps 504 to 506 are reiterated.

In the step 507, the loading phase is stopped.

It should be noted that, if the control unit 21 receives a command to stop the loading phase during the step 502, the step 507 is then performed.

Figure 6:
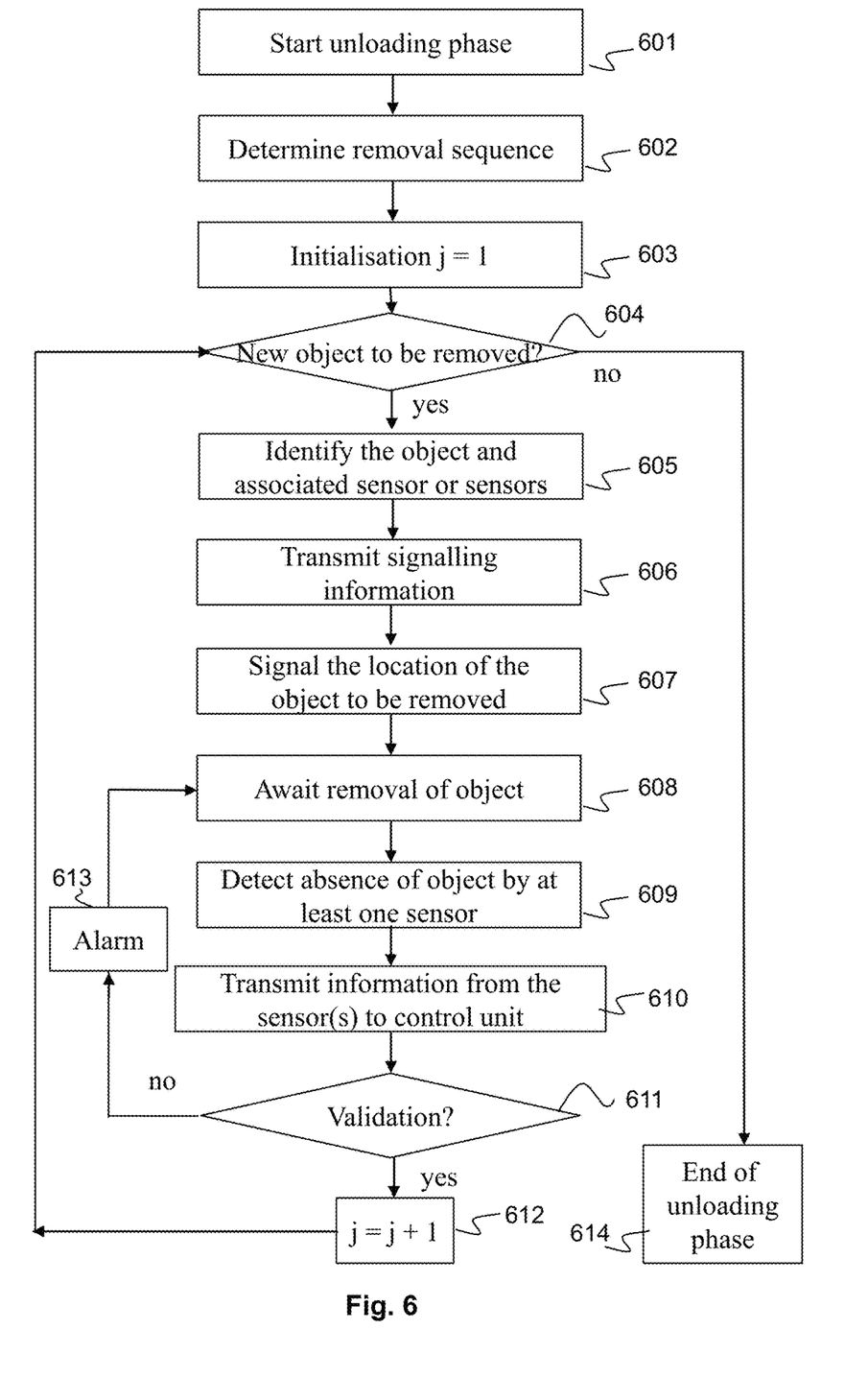
FIG. 6 illustrates schematically a method for assisting the ordered removal of objects.

FIG. 6 shows schematically a method for the ordered removal of objects implemented by the temporary-storage system 20 in the unloading phase.

In a step 601, the control unit 21 receives a command for starting the unloading phase. The command for starting the unloading phase may, for sequential operation of the loading and unloading phases, be a command to switch from the loading phase to the unloading phase. In a parallel operation of the loading and unloading phases, the command to start the unloading phase may be received at the same time as the command to start the loading phase.

In a step 602, the removal sequence is determined by the control unit 21 from at least one predefined rule and assigns a removal rank to each recorded object-deposition trace. The removal sequence may for example follow a FIFO (meaning first in first out") method and the objects are stored in the removal sequence in the same order as the deposition sequence. In this case, the predefined rule indicates to the control unit 21 to determine the removal sequence commencing with the first object deposited and running through the objects deposited in the order of their deposition rank. The removal sequence may in a variant follow a LIFO (standing for "last in last out") method. In another variant, the removal sequence is independent of the deposition sequence. The removal sequence is then determined for example according to other parameters determined when the objects are deposited (such as their mass, their surface area on the ground, etc.) according to physical quantities measured by the sensors 11. In a particular embodiment, a desequencing of objects prior to the storage is identified in the production line. The removal sequence is then determined from at least one rule received by the control unit 21 coming from a control system of the production line, in order to resequence the objects deposited on the temporary-storage belt 10.

In the case of a parallel operation of the loading and unloading phases, the control unit 21 initially identifies whether there is at least one trace of a deposition of an object recorded in the context of the loading phase and recovers the corresponding recording or recordings.

In a step 603, the control unit 21 initialises a removal sequence, for example by allocating a value "1" to an incremental variable j.

In a following step 604, the control unit 21 checks whether there remains at least one object to be removed from the temporary-storage belt 10. If such is the case, a step 605 is performed. Otherwise, in a sequential operation of the loading and unloading phases, a step 614 is performed, while, in a parallel operation of the loading and unloading phases, the control unit 21 awaits the recording of a new object-deposition trace in the context of the loading phase.

In the step 605, the control unit 21 identifies the sensors 11 that were activated by the deposition of the object of removal rank j in the context of the loading phase. In a variant, the control unit 21 identifies the signalling zones corresponding to said sensors 11 or identifies the calculated position of the object in question, recorded in association with the trace of the deposition of said object.

In a step 606, the control unit 21 determines signalling information making it possible to signal the location of the object of removal rank j: the signalling information comprises the identification of the sensors 11 referenced in association with the trace of the deposition of the object of rank j. In a variant, the signalling information comprises an identification of the signalling zones to be activated. In another variant, and in particular in the case where the temporary-storage system 20 is collaborating with the robot 230, the signalling information comprises the calculated position of the object in question. The control unit 21 transmits the signalling information so that the signalling means 22 can activate the signalling zones 41, 42 or the corresponding lamps 31, 32.

In a step 607, the signalling means 22 signal the location of the object of removal rank j, respecting the signalling information. In a particular embodiment wherein the temporary-storage system 20 is collaborating with the robot 230, the robot 230 comprises control software that receives the signalling information transmitted by the signalling means 22. The control software of the robot 230 then itself determines the movement that the robot 230 must make to remove the object and to deposit it in another predetermined location.

In a step 608, the control unit 21 awaits the removal of the object of removal rank j. When said object is removed, the sensor or sensors 11 activated by the object of removal rank j in the context of the loading phase detect the absence of the object in question in a step 609, and each sensor 11 detecting the absence of said object transmits information representing this detection to the control unit 21 in a step 610.

In a step 611, the control unit 21 checks whether the sensor or sensors 11 that detected the absence of the object correspond to the sensor or sensors 11 activated by the deposition of the object of removal rank j in the context of the loading phase: if there is a match, the removal of the object of removal rank j is validated, the trace of the object in question is deleted and a step 612 is performed. Otherwise a step 613 is performed during which an alarm is activated, then the step 608 is reiterated and the control unit 21 once again awaits the removal of the object of removal rank j.

The step 613 consists for example of the control unit 21 sending an error message indicating that the removal of the object is incorrect and that the object removed in error must be re-placed. In a particular embodiment, the control unit 21 defines and transmits to the signalling means 22 signalling information indicating the location where the object removed in error must be re-placed. The control unit 21 collects information representing the detection of the presence of the object by the sensors 11, activated by deposition of the object removed in error. The control unit 21 next transmits to the signalling means 22 the signalling information previously determined at the step 606. The signalling means 22 then indicate the location of the object of removal rank j in the same way as during the preceding step 607. The control unit 21 next reiterates the step 608.

In another particular embodiment of the step 613, the control unit 21 identifies the rank of the object removed in error by identifying with which recorded object-deposition trace the sensors 11 that detected the absence of the object removed in error are associated. The control unit 21 then sends an error message indicating simply that the object should be re-placed. When the object removed in error is re-placed, the identification of the sensors 11 associated with the trace of the object removed in error is then replaced by the identification of the sensors 11 activated by the redeposition of the object in question. In a variant, the signalling zones corresponding to said sensors 11, or the calculated new position of the object in question, can be recorded by respectively replacing the signalling zones previously associated with the trace of the object deposition or the previous calculated position of the object. The control unit 21 next transmits to the signalling means 22 the signalling information previously determined at the step 606. The signalling means 22 then indicate the location of the object of removal rank j in the same way as during the preceding step 607. The control unit 21 next reiterates the step 608.

In the step 612, the control unit 21 identifies the following removal rank in the removal sequence, for example by incrementing the variable j. In a parallel operation of the loading and unloading phases, the control unit 21 identifies and recovers in advance one or more possible traces of depositions of objects recorded in the context of the loading phase in the same way as at the step 602 and determines the remainder of the removal sequence.

The step 604 is then reiterated, taking into account the new removal rank j.

In the step 614, performed in the case of a sequential operation of the loading and unloading phases, the removal sequence is terminated and the control unit 21 terminates the unloading phase. The temporary-storage system 20 is then put on standby, disconnected or stopped. The temporary-storage system 20 may in a variant go into the loading phase once again if a command for starting the loading phase has been received by the control unit 21.

Figure 7:
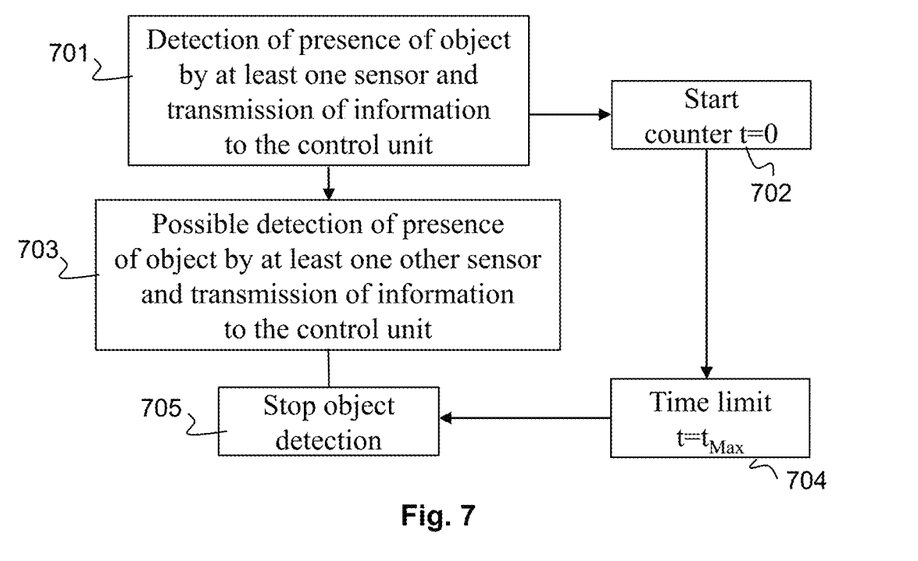
FIG. 7 illustrates schematically a method for detecting an object in a particular embodiment of the present invention.

FIG. 7 illustrates a method for detecting one and the same object by a plurality of sensors 11 corresponding to a particular embodiment of all of steps 503 and 504 of the method for the ordered detection of objects depicted in FIG. 5.

When an object, such as for example the object 12, is deposited on the temporary-storage belt 10, the object in question may be detected by a plurality of sensors 11. In a first case, the sensors 11 are activated simultaneously by the object in question and transmit at the same time information representing the detection of the presence of the object in question to the control unit 21. In a second case, the sensors 11 are not activated at the same time by the object in question, for example if said object is not directly deposited flat. By virtue of the algorithm in FIG. 7, all the sensors 11 detecting one and the same object 12, 13 are recorded in association with the same object-deposition trace, even when the activation is not simultaneous.

In a step 701, at least one first sensor 11 is activated by a deposition of an object, for example the object 12, and transmits information representing the detection of the presence of the object 12 to the control unit 21. A step 702 is then performed, during which the control unit 21 starts a time counter.

In a step 703, at least one second sensor 11 different from the first sensor 11 is also activated by the deposition of the object 12 and transmits information representing the detection of presence to the control unit 21. Each second sensor 11 activated during the step 703 is referenced in association with the trace of the same deposition of an object as each first sensor 11 activated at the step 701, in other words with the trace of the deposition of the object 12. When the deposition of the object 12 activates a single sensor 11, the presence of the object 12 is detected solely at the step 701, and the step 703 simply does not take place.

In a step 704, the time counter reaches a predefined time limit $t_{MAX}$. The step 704 immediately gives rise to a step 705, during which the detection of the object 12 is stopped by the control unit 21. Stopping the detection of the object 12 consists in stopping associating the sensors 11 activated by a deposition of an object with the same object-deposition trace. If a third sensor 11 is activated after the detection of the object 12 has been stopped in the step 705, the activated third sensor 11 is referenced by the control unit 21 in association with the trace of a new deposition of an object.

The predefined time limit $t_{MAX}$ is determined so as to be greater than an estimated duration of deposition of any object liable to be deposited on the temporary-storage belt 10 and less than an estimated minimum period between two successive depositions of objects.

Figure 8:
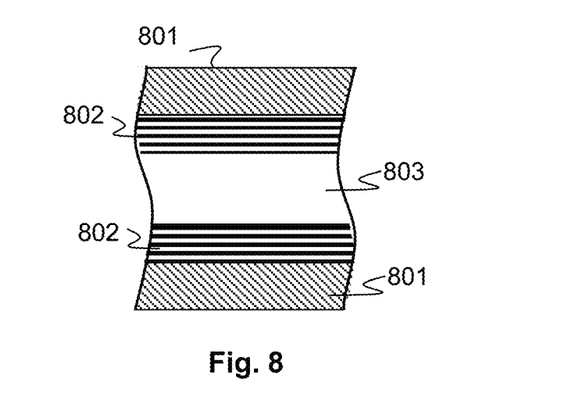
FIG. 8 illustrates schematically an arrangement of five superimposed layers, for wiring sensors of the temporary-storage belt, in a particular embodiment of the present invention.

FIG. 8 illustrates an arrangement of five superimposed layers, for wiring the sensors 11 in a particular embodiment. The two outer layers 801 are shielding layers, produced for example with silver conductive ink. The two intermediate layers 802 are track insulation layers, which can be produced with an insulating varnish. The central layer 803 is a conductive layer, forming the sensors 11 and tracks for connecting the sensors 11 to the control unit 21. The central layer 803 is produced for example with silver conductive ink.

The wiring is preferentially implemented with one track per sensor 11 and may be combined with an analogue multiplexing circuit. The sensors 11 are thus monitored independently of each other by the control unit 21.

Figure 9:
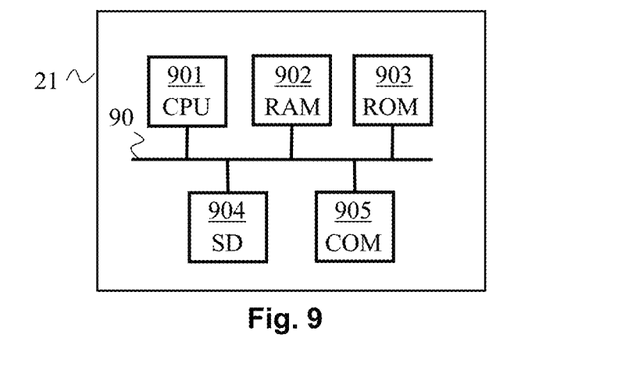
FIG. 9 illustrates schematically an example of hardware architecture of a control unit of the temporary-storage system.

FIG. 9 illustrates schematically an example of a hardware architecture of the control unit 21 according to a particular embodiment. The control unit 21 then comprises, connected by a communication bus 90: a processor or CPU (central processing unit) 901; a random access memory RAM 902; a read only memory ROM 903; a storage unit, such as a hard disk, or a storage medium reader, such as an SD (Secure Digital) card reader 904; at least one communication interface COM 905 enabling the control unit 21 to communicate at least with the temporary-storage belt 10 and the signalling means 22. The processor 901 is capable of executing instructions loaded in the RAM 902 from the ROM 903, from an external memory, from a storage medium (such as an SD card), or from a communication network. When the control unit 21 is powered up, the processor 901 is capable of reading instructions from the RAM memory 902 and executing them. These instructions form a computer program causing the complete or partial implementation, by the processor 901, of the methods described previously in relation to FIGS. 5, 6 and 7. The methods described in relation to FIGS. 5, 6 and 7 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general terms, the control unit 21 comprises electronic circuitry adapted and configured for implementing the steps and methods described previously.

The invention claimed is:

1. A method for temporarily storing objects in a temporary-storage system comprising a temporary-storage belt, a control unit and signalling means, the temporary-storage belt comprising a plurality of regularly distributed sensors, the position of each sensor on the temporary-storage belt being distinctly identified, wherein the temporary-storage method causes the temporary storage system to perform the steps of:
   a loading step during which objects may be deposited on the temporary-storage belt;
   an unloading step during which guidance is provided for removing the deposited objects that are temporarily stored on the temporary-storage belt,
   the loading step comprising:
      detecting, during a loading phase during which objects may be deposited on the temporary-storage belt, by at least one of the sensors, an object deposited on the temporary-storage belt, when the object is deposited on the temporary-storage belt at the position of the at least one of the sensors,
      for each deposition of an object detected, receiving, during the loading phase during which objects may be deposited on the temporary-storage belt, by the control unit, information representing the deposition coming from the at least one of the sensors which detected the deposited object, and
      for each deposition of an object detected, recording during the loading phase during which objects may be deposited on the temporary-storage belt, a trace of the deposition of the object in association with a reference to each of the sensors activated by the deposition of the object;
   and to perform the steps during an unloading phase during which guidance is provided for removing the deposited objects that are temporarily stored on the temporary-storage belt:
      determining, during an unloading phase during which guidance is provided for removing the deposited objects that are temporarily stored on the temporary-storage belt, by the control unit, a removal sequence indicating the order in which the objects deposited on the temporary-storage belt must be removed,
      identifying, during the unloading phase during which guidance is provided for removing the deposited objects that are temporarily stored on the temporary-storage belt by the control unit, for each object to be removed in the order of the removal sequence the referenced sensors that have been activated by the deposition of the object in the context of the loading phase,
      transmitting, during the unloading phase during which guidance is provided for removing the deposited objects that are temporarily stored on the temporary-storage belt by the control unit, to the signalling means, signalling, for each object to be removed in the order of the removal sequence, information identifying the position of the object to be removed from the sensors identified,
      signalling, during the unloading phase during which guidance is provided for removing the deposited objects that are temporarily stored on the temporary-storage belt, by the signalling means, for each object to be removed in the order of the removal sequence, the position of the object to be removed, and
      when the object is removed from the temporary-storage belt, receiving, during the unloading phase during which guidances is provided for removing the deposited objects that are temporarily stored on the temporary-storage belt, corresponding information coming from at least one of the sensors and continuing the removal sequence with a new object to be removed, if such exists.

2. The method according to claim 1, wherein, in the loading phase, the recording of a trace of the deposition of the object is implemented in association with a deposition rank, and, in the unloading phase, the removal sequence is defined according to the deposition ranks of objects.

3. The method according to claim 1, wherein the unloading phase further comprises, following the detection of the absence of the object to be removed by at least one of the sensors:
   checking whether there is a match between the sensors referenced in association with the deposition of the object and the sensors that detected the absence of the object; and
   in the case of a negative check, triggering an alarm.

4. The method according to claim 3, wherein the alarm triggered in the case of a negative check indicates re-placing the object that was removed in error, and the sensors activated by the redeposition of the object are referenced in association with the trace of the filing of the object that was removed in error and in replacement for the sensors referenced previously in association with the trace of the deposition of said object.

5. The method according to claim 1, wherein the removal sequence determined follows a FIFO method.

6. The method according to claim 1, wherein the loading phase and the unloading phase are implemented in parallel by the control unit.

7. The method according to claim 1, wherein the control unit calculates a position on the temporary-storage belt of each object deposited and the signalling information indicates the calculated position of the object so that a robot can discharge the object from the calculated position.

8. A non-transitory information storage medium embodying a computer program, comprising a set of instructions causing the execution, by a processor, of the method according to claim 1, when said computer program is executed by said processor.

9. A system for the temporary storage of objects, comprising a temporary-storage belt, a control unit and signalling means, the temporary-storage belt comprising a plurality of regularly distributed sensors, the position of each sensor on the temporary-storage belt being distinctly identified,
   wherein, in a loading phase during which objects may be deposited on the temporary-storage belt, each sensor is configured for:
      detecting an object deposited on the temporary-storage belt, when the object is deposited on the temporary-storage belt at the position of the sensor, wherein, in the loading phase, the control unit of the temporary-storage system is configured for:
for each deposition of an object detected, receiving information representing the deposition coming from the at least one of the sensors, and
for each deposition of an object detected, recording a trace of the deposition of the object in association with a reference to each of the sensors activated by the deposition of the object;
and wherein, in an unloading phase during which guidance is provided for removing the deposited objects that are temporarily stored on the temporary-storage belt, the control unit of the storage system is configured for:
determining a removal sequence indicating the order in which the objects deposited on the temporary-storage belt must be removed,
and, for each object to be removed in the order of the removal sequence:
identifying the referenced sensors that have been activated by the deposition of the object in the context of the loading phase,
transmitting to the signalling means signalling information identifying the position of the object to be removed from the sensors identified, and
when the object is removed from the temporary-storage belt, receiving corresponding information coming from at least one of the sensors and continuing the removal sequence with a new object to be removed, if such exists, and the signalling means of the storage system are configured for:
signalling the position of the object to be removed when a signalling information identifying the position of the object to be removed is received.

10. A temporary-storage system according to claim 9, wherein the signalling means comprise an illumination device integrated in the temporary-storage belt, the illumination device comprising at least one lamp identifying the location of each sensor.

11. The temporary-storage system according to claim 9, wherein the signalling means comprise a display screen comprising at least one signalling zone showing the location of each sensor.

12. The temporary-storage system according to claim 9, wherein each sensor is connected to the control unit by means of a track, and wherein the temporary-storage belt comprises five layers superimposed in the following order: a first shielding layer, a first insulation layer, a conductive central layer forming the sensors and the tracks, a second insulation layer and a second shielding layer.

13. The temporary-storage system according to claim 9, wherein the control unit comprises a processor executing the computer program according to claim 8 and furthermore comprises a microcontroller in the temporary-storage belt that executes embedded software performing measurements and a filtering of the signals detected by each sensor, so as to detect the activation and the deactivation of each sensor.

14. A Production line comprising a temporary-storage system according to claim 9 and further comprising an upstream production station and a downstream production station, wherein the production line comprises comprising circuitry causing the production line to perform:
transmitting to the control unit a command to start the loading phase, so that,
detecting by the control unit the presence of the object when an asynchronism occurs between the upstream production station and the downstream production station or when a sequencing fault occurs on the upstream production station and an object is deposited on the temporary-storage belt, the control unit detects the presence of the object,
transmitting by the production line to the control unit a command to start the unloading phase when the asynchronism or respectively the sequencing problem disappears.

\* \* \* \* \*